United States Patent [19]
Yamaguchi et al.

[11] 3,895,546
[45] July 22, 1975

[54] TRANSFER TRANSMISSION MECHANISM

[76] Inventors: Hiroji Yamaguchi, 50-4 chome, Oyama-cho, Kariya, Aichi Prefecture; Tunehiko Ogasahara, 14-2 Takabe, Chiryu, Aichi Prefecture, both of Japan

[22] Filed: Apr. 23, 1973

[21] Appl. No.: 353,611

[30] Foreign Application Priority Data
Apr. 27, 1972 Japan.................................. 47-43162

[52] U.S. Cl................................. 74/695; 74/710.5
[51] Int. Cl............................................. F16h 37/08
[58] Field of Search.......... 74/710.5, 695; 180/44 R

[56] References Cited
UNITED STATES PATENTS

| | | | |
|---|---|---|---|
| 2,947,200 | 8/1960 | Stump............................ | 74/710.5 X |
| 3,195,371 | 7/1965 | Christie................................ | 74/695 |
| 3,378,093 | 4/1968 | Hill...................................... | 180/44 R |
| 3,413,873 | 12/1968 | Bixby..................................... | 74/695 |

*Primary Examiner*—Samuel Scott
*Assistant Examiner*—F. D. Shoemaker

[57] ABSTRACT

A transfer mechanism for use in a motor vehicle assembly having a source of power and a pair of first and second aligned axles, the transfer mechanism including a planetary spur gear train formed of three elements, i.e., a sun gear, a set of planetary pinions and an internal ring gear in mesh with the planetary pinions. A stationary member supports the three elements and a control system is provided for changing the meshing relation between the elements.

5 Claims, 6 Drawing Figures

PATENTED JUL 22 1975   3,895,546

SHEET 3

TRANSFER TRANSMISSION MECHANISM

BACKGROUND OF THE INVENTION

This invention relates to transfer transmissions for distributing power from an input to a pair of driven axles.

More particularly, this invention relates to a structure of the general type in which torque in an equal or unequal amount can be transmitted from an engine to both the driven shafts, such as for example, front and rear axles of a motor vehicle, the torque being split to provide a proper, predetermined, division of energy in accordance with requirements.

A study of the various known transfer transmissions used on motor vehicles of different types, will show that a mechanism has been utilized in most of the known transfer transmissions for equally distributing power from the input to both the front and rear axles or to both rear wheels. On the other hand, motor trucks are generally provided with a transfer transmission in which the bebel differential gear trains are so constructed and arranged that the front wheels and rear wheels receive predetermined different powers, such as for example, 30 percent of the power and 70 percent of the power respectively, in proportion to the actual load distribution on the axles. Further, such transfer mechanism is often provided with speed changing mechanisms to effect output speed variations, for example, two higher and lower steps of the speed. Either employment of the bebel gear trains or such speed change mechanism is apt to make the entire assembly a larger sized one.

These types of conventional mechanism may not be suitable for automotive vehicle purposes, either because there is not sufficient room for the bebel gear trains or because of higher manufacturing costs.

SUMMARY OF THE INVENTION

A principal object of the present invention is to provide a transfer transmission including a mechanism of compact form, the torque being split to provide a predetermined division of energy in accordance with requirements.

Thus, according to one embodiment, there is a source of power and a pair of driven axles. The embodiment is further equipped with a planetary or epycyclic spur gear train including three elements, namely a sun gear, at least one pinion planetary gear and a ring gear. A stationary member is provided for supporting said three elements respectively so as to be fixed, to revolve or to turn. Control means is also provided for enabling one of said three elements to engage with said stationary member, said source of power or one of the driven axles.

DESCRIPTION OF THE PREFERRED EMBODIMENTS

Figure 1:
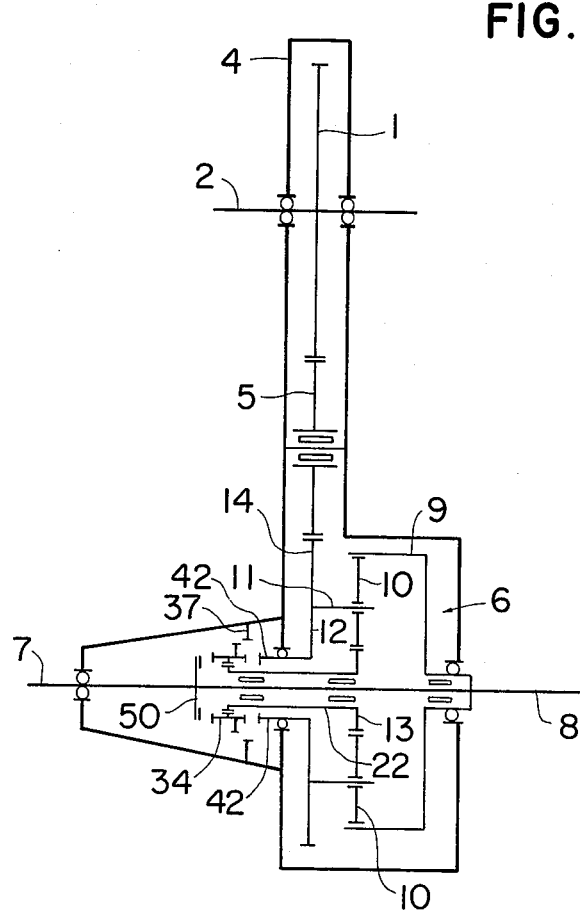
FIG. 1 is a diagramatic view of a transmission mechanism according to the present invention.

In FIG. 1 is diagramatically shown an outline of a transfer transmission mechanism according to the present invention. An input gear 1 is mounted on an input shaft 2 rotatably supported by means of ordinary bearings seated on the casing 4 enclosing the mechanism. The input gear 1 serves to drive via an idling gear 5 a planetary gear train which is indicated generally by the numeral 6 and will be described hereinafter in detail. The power from the input shaft 2 is distributed to both output shafts 7 and 8 through the planetary gear train, providing a gear ratio which will apply torque to each axle in accordance with predetermined design. Although both output shafts 7 and 8 are indicated in one solid line in the drawing they are different shafts which are in aligned relation to each other and rotatable individually. A ring gear 9 is integral with the right hand output shaft 8 whereas the left output shaft 7 is driven by the input shaft through the planetary gear train 6 as will be discussed as the description proceeds. The ring gear 9 has inner teeth which mesh with a suitable number of planetary pinions 10. The planetary pinions 10 are rotatably mounted on shafts 11 which are secured to a planetary arm 12. The planetary pinions 10 are in mesh with a sun gear 13, and a ring gear 9. The ring gear 9 is integrally connected with a first driven shaft 8 which is rotatably supported in the casing 4'. A carrier gear 14 which is integral with arm 12 meshes with idling gear 5. The ring gear 9, planetary gears 10 and sun gear 13 provide an ordinary arrangement of spur planetary gearing which gives differential motions.

In the application of this gearing there are four possible modes of operation as will be explained hereinafter. In the first mode of operation, either output shaft is isolated from the gearing and accordingly no torque is transmitted to the both output shafts from the input shaft 2. In the second mode of operation, the sun gear 13 may be stationary and gears 10 and 9 may revolve so that the power from the input shaft 2 is applied only to the output shaft 8 and the other output shaft 7 remains stationary.

In the third mode of operation, the planetary arm 12 and the sun gear 13 are locked together. As a result, the entire mechanism is locked together as a unit so that there is no gearing action between the differential members. The same or equal torque is thus transmitted from the input shaft to the both output shafts.

In the fourth mode of operation, the ring gear 9 and the sun gear 13 are locked to the corresponding output shafts so that the power from the input shaft 2 is distributed to the output shaft 7 and the output shaft 8, permitting either axle to lag and providing a gear ratio which will apply torque to each output shaft in accordance with the predetermined design.

Figure 2:
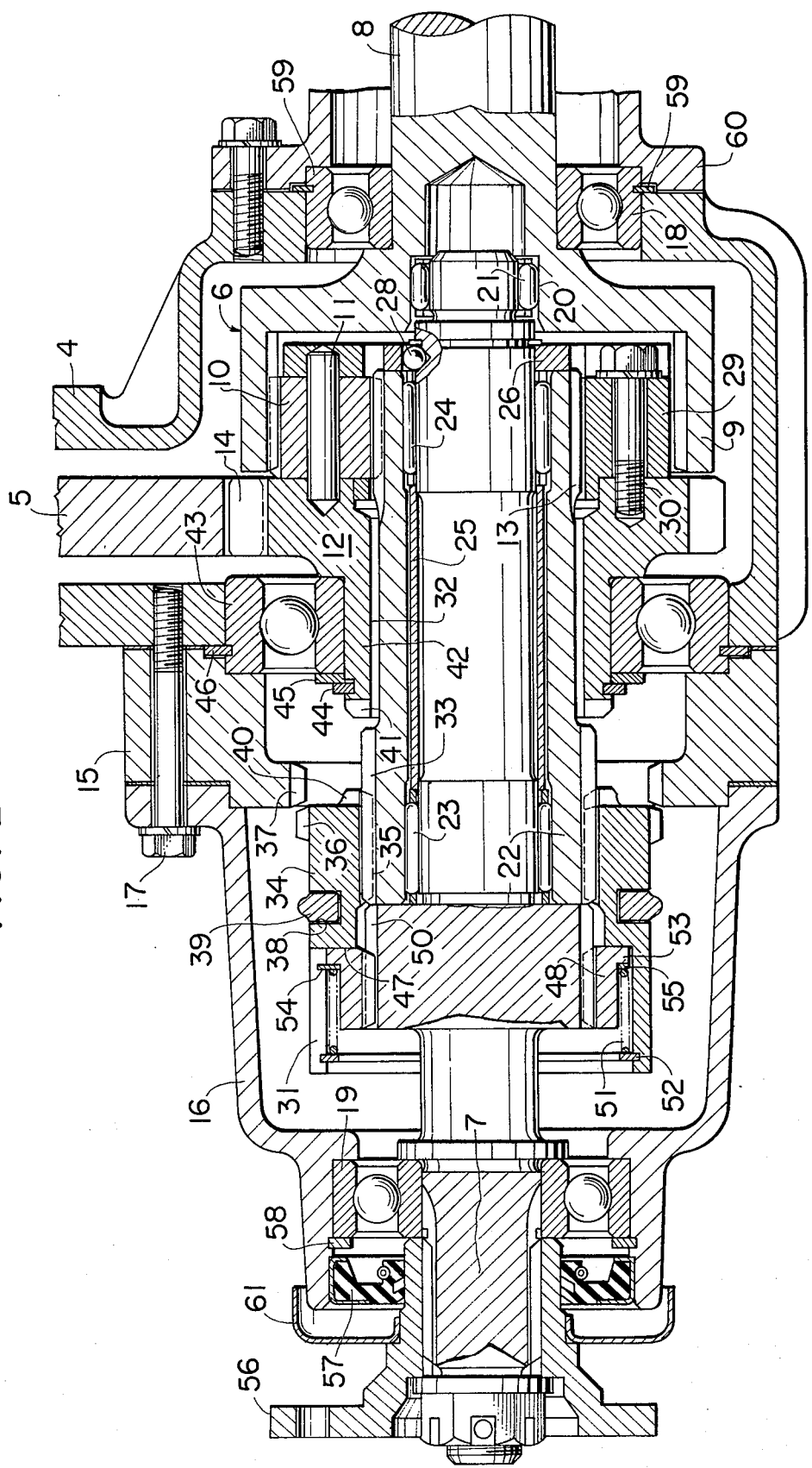
FIG. 2 is a vertical section of the mechanism of FIG. 1.

Referring now to FIG. 2, the casing 4, median member 15 and a cover 16 are so bolted together by means of ordinary bolts 17 as to provide one housing for enclosing the mechanism. The output shaft 8 is rotatably mounted by means of ball bearing assembly 18 seated in the casing 4 and the other output shaft 7 is also rotatably mounted by means of a ball bearing assembly 19 seated in the cover 16. The output shaft 8 has an axial bore 20. The right hand end of the other output shaft 7 is rotatably supported in the bore 20 through needle bearing assembly 21 to provide an alignment relation between both output shafts. A sleeve 22 is rotatably carried on the output shaft 7 by means of a pair of needle bearings 23 and 24. Between both needle bearings is interposed a hollow tubular spacer 25 to prevent shifting of these needle bearings toward each other. A keeper plate 26 is so diametrically sized as to sufficiently clamp the sleeve or hub 22 against axial movement through balls 28. To the planetary arm 12 is firmly bolted a holder member 29 by means of a suitable number of bolts 30. The holder member 29 has a plurality of recessed portions within which are nested the corresponding number of the planetary pinions 10 which are loosely mounted on the corresponding shafts 11. The shafts 11 are supported at both their ends to provide a sufficient support against the power transmitted from the input gear 1 through the idling gear 5 and the planetary pinions 10. The hub or sleeve 22 is toothed at the right hand end to provide the sun gear 13 for the planetary pinions 10. The hub 22 passes through the central hole 32 of the planetary arm 12 in spaced relation therewith as will be seen in the view. At the left hand end of the hub is a splined portion 33 for engagement with an internal splined portion 35 of second sleeve 34. The second sleeve 34 has further an outer splined portion 36 to selectively engage a corresponding splined portion 37 of the median member 15. In the outer surface of the sleeve 34 is formed a ring groove 38 for slidably receiving the usual shifting fork 39 manually operable by the driver of the vehicle to axially shift the sleeve on the first sleeve 22.

The sleeve 34 is formed at the right hand end face with a series of teeth 40 for engagement with a corresponding series of teeth 41 in the end face of the hub 42 of the planetary arm 12. The hub 42 of the planetary arm 12 is machined on its outer periphery to seat the inner raceway of the ball bearing assembly 43. The inner race of the inner ball assembly is clamped against axial movement by means of a snap ring 44 and a ring 45. The outer race of the ball bearing assembly 43 is also clamped against axial movement relative to the casing by means of another snap ring 46 interposed between the casing 4 and median member 15. The left half of the second sleeve 34 is of somewhat enlarged internal diameter to provide a shoulder 47. Within the internally larger diameter portion of the second sleeve 34 is slidably received a third sleeve 48 internally splined for normally engaging the splined portion 50 of the output shaft 7. The splined portion 50 is of larger diameter as compared to the other portions so as to provide clamping means against leftward movement of the sleeve 22. A compression spring 51 is retained between a snap ring 52 and a flange 53 of the sleeve 48 to urge the sleeve to the end face of the shoulder of the sleeve 34. The right hand end of the spring 51 is received by the thrust plate 55 a projection 54 of which is slidably received within an axial slit 31 formed in the wall of the sleeve 34 for preventing torsion as would be exhibited by a rotational speed differential between the sleeves 48 and 34.

The output shaft 7 at its left end portion is in splined connection with a coupler member 56. A U-shaped seal 57 seals the coupler member 56 against external leakage of the lubricating oil within the housing. The ball bearing assembly 19 is clamped against axial movement by a snap ring 58 and the ball bearing assembly 18 is also clamped against axial movement by a snap ring 59 interposed between the casing 4 and the cover 60. A disk form cover 61 on the coupler member 56 is provided for protecting the seal 57 against dirt or other harmful matter.

For the purpose of description of the operation, the first mode of operation, namely neutral position of the mechanism will be first discussed. In this mode, individual parts of the mechanism are in the positions shown in FIG. 2.

In order to illustrate this mode, assume that the mechanism is applied to an automotive vehicle in which the input shaft is driven by the engine through the usual transmission (not shown) while the both output shafts 7 and 8 are connected to vehicle wheels or other devices such as load lifting devices. The internal ring gear 9 is integral with the output shaft 8 while the sun gear 13 is loose on the output shaft 7. The fact that the second sleeve 34 does not mesh with the splined portion 50 of the output shaft 7 makes possible the free rotation of the first sleeve 22 on the output shaft 7. Since both output shafts are held in connection with certain loads, the rotation of carrier or planetary arm 12 will result in a mere free rotation of the sleeve 22. No transmission of motion is effected from the input shaft 2 to the both output shafts 7 and 8, the neutral position of the mechanism being thus effected.

Figure 3:
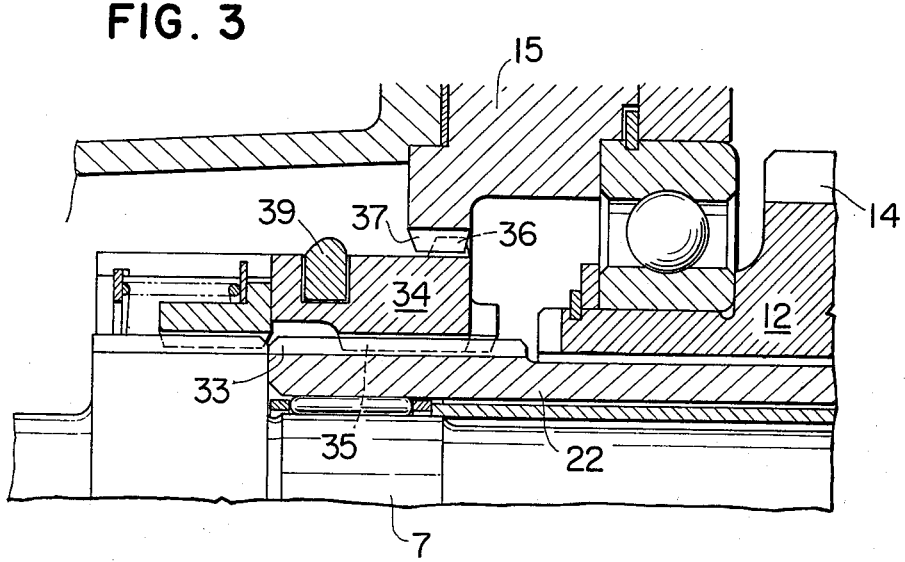
FIGS. 3 to 5 are sections on enlarged scale of detailed portions of the mechanism.

In the second mode of operation, as shown in FIG. 3, the second sleeve 34 remains stationary relative to the housing, namely to the median member 15, holding its splined portion 36 in mesh with the internal spline 37 of the median member 15. The sun gear 13 is thus held stationary so that the rotation of the idling gear 5 will cause rotation of the ring gear 9 through the carrier gear 14, planetary arm 12 and the planetary pinion 10. Power from the input shaft is thus only transmitted to the output shaft 8 in this mode of operation.

Figure 4:
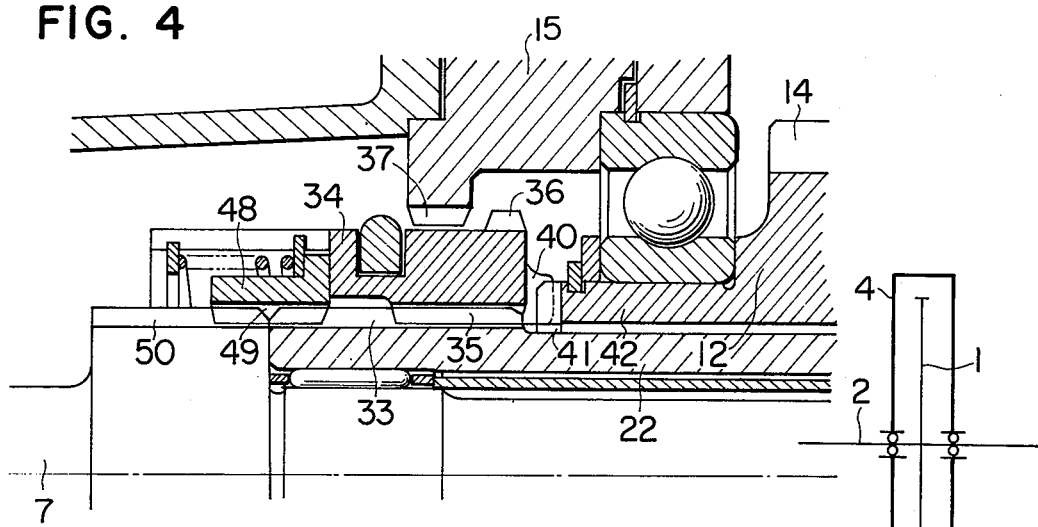

In the third mode of operation, as illustrated in FIG. 4. The second sleeve 34 is further shifted to the right causing the teeth 40 to mesh with the teeth 41 of the hub 42 and the splined portion 36 to disengage from the internal splined portion 37 of the median member 15. Since the third sleeve 48 is normally spring biased to the second sleeve 34, it follows the second sleeve 34 so that the spline 49 of the third sleeve 48 is held in mesh with both splines 50 and 33. In detail, the carrier gear 14 or planetary arm 12, second sleeve 34, first sleeve 22, third sleeve 48 and thence output shaft 7 are all locked together as a unit. From the foregoing, it is obvious that locking the first sleeve 22 to the gear 14 will cause the sun gear 13 to be locked to the planetary pinions 10 and thence to the ring gear 9. It will be noted that all the parts of the assembly become locked together as a unit and action resulting from the entire mechanism is the same as in any ordinary differential mechanism. The same power is transmitted to both the output shafts 7 and 8. There is no gear action in this mode of operation.

Figure 5:
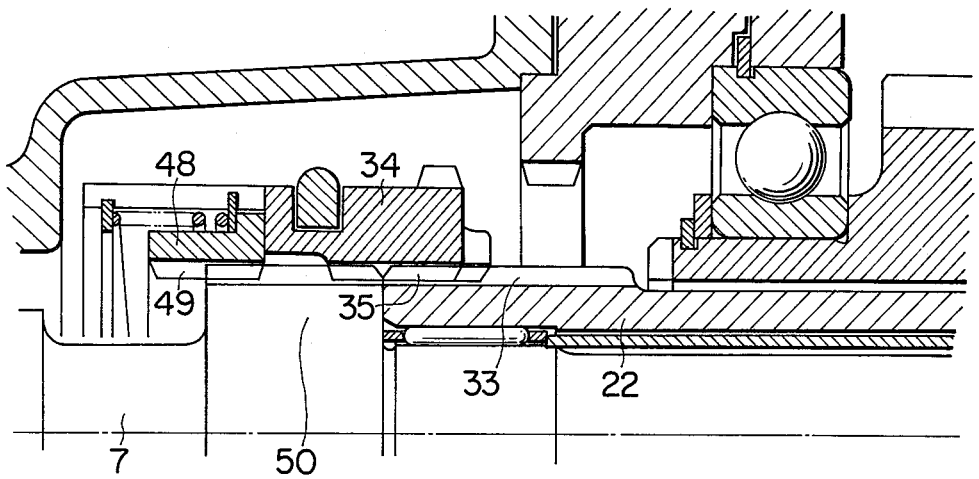

In the fourth mode of operation, as shown in FIG. 5, the second sleeve 34 is held in the left endmost position. The spline 35 of the second sleeve 34 is held in mesh with both splined portions 33 and 50 so that the first sleeve 22 or sun gear 13 and the output shaft 7 are locked together. It will be apparent that the power from the input shaft is distributed to both output shafts, providing a gear ratio which will apply to each output shaft torque in accordance with the predetermined design.

Figure 6:
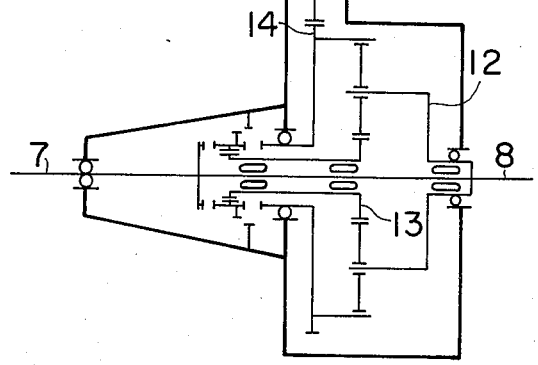
FIG. 6 is a similar view to that of FIG. 1 showing another embodiment of the present invention.

In FIG. 6 is shown another embodiment of the present invention. In this embodiment, the planetary arm 12 is keyed to the output shaft 8 while the ring gear 9 is in mesh with the idling gear 5 through the gear 14 fastened thereto. It is obvious that if the embodiment is operated in the second mode of operation, a reduction of output speed is effected on the output shaft 8 with a speed due to a gear ratio between the gears, whereas the first embodiment always provides increase of speed in the second mode of operation.

What is claimed is:

1. In a transfer mechanism for use in a motor vehicle assembly having a source of power and a pair of first and second driven axles aligned with each other, said transfer mechanism including: a three-element planetary gear train consisting of a sun gear, a carrier with at least one pinion gear thereon in mesh with said sun gear and an internal ring gear in mesh with said pinion gear; means connecting one of said three elements in driving relation with said source of power; a second of said three elements being integrally connected with said first driven axle for rotation therewith; a stationary member mounted on a stationary portion of the vehicle and control means for selectively engaging the remaining one of said three elements with said stationary member, said second driven axle, or both said second driven axle and said first one of said three elements, such that said three element planetary gear can be actuated as a differential gear as well as a speed change gear with one of said driven axles isolated from said source of power.

2. The transfer mechanism of claim 1 wherein, said control means includes a single manually operable member and an axially slidable first sleeve member drivenly connected to said manually operable member and always connected to said sun gear in aligned relation, said first sleeve member being operatively and selectively connected in meshed relation with said stationary member, said source of power or said second axle.

3. The transfer mechanism of claim 2 further comprising a second sleeve member in aligned relation with said first sleeve member and normally spring biased to abut said first sleeve member.

4. The transfer mechanism of claim 1 wherein said planetary arm is drivenly connected with said source of power and said ring gear is drivingly connected to said first driven axle.

5. The transfer mechanism of claim 1 wherein said planetary arm is drivingly connected to said first driven axle and said ring gear is drivenly connected to said source of power.

* * * * *